Aug. 4, 1959 J. H. FOSTER 2,898,519

PRINTED CIRCUIT ASSEMBLY

Filed Nov. 14, 1955

INVENTOR.
James H Foster
BY Ralph Hammar
Attorney

United States Patent Office 2,898,519

Patented Aug. 4, 1959

2,898,519

PRINTED CIRCUIT ASSEMBLY

James H. Foster, Erie, Pa., assignor to Erie Resistor Corporation, Erie, Pa., a corporation of Pennsylvania Application November 14, 1955, Serial No. 546,483

3 Claims. (Cl. 317—101)

This invention is a multiple element electronic network sub-assembly made up of leadless pin-like components held in clips clinched to a panel carrying the inter-component wiring. In one form, the clips may have integral prongs for plug-in connections. The entire assembly has a molded plastic case.

Figure 1:
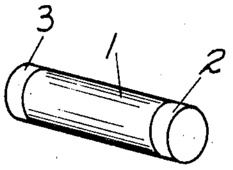
Figure 2:
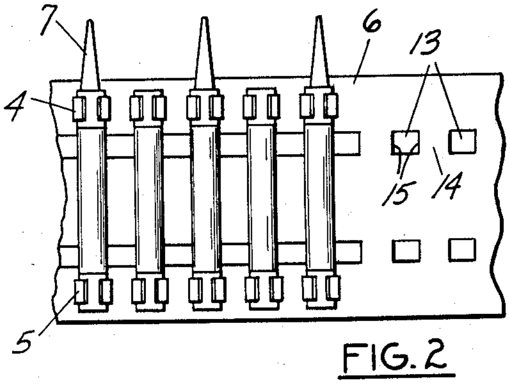
Figure 7:
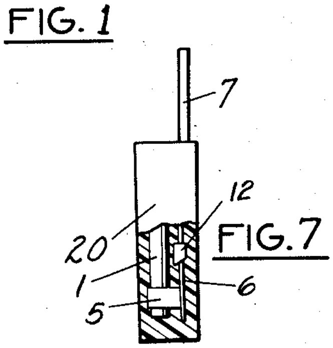
Figure 8:
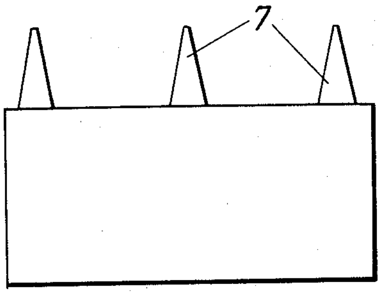
Figure 3:
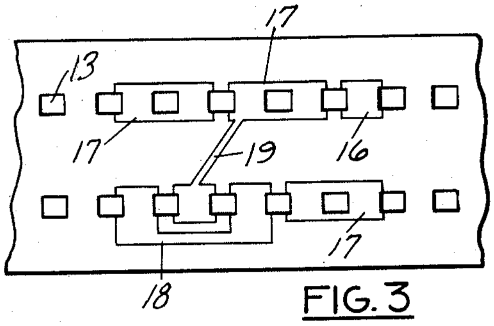
Figure 6:
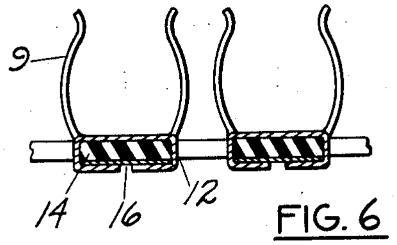
Figures 4, 5:
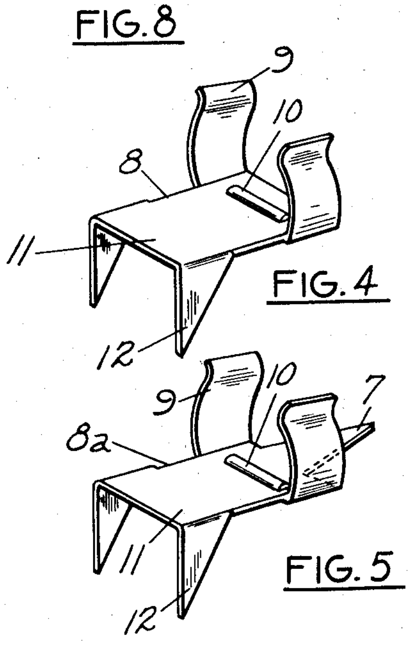

In the drawing, Fig. 1 is a view of a pin-like component; Fig. 2 is a top plan of a panel containing a plurality of components; Fig. 3 is a bottom plan of the Fig. 2 panel showing the inter-component printed wiring; Fig. 4 is a perspective of a clip; Fig. 5 is a perspective of another clip having an integral plug-in prong; Fig. 6 is a section showing the attachment of the clips to the panel and the connection of the clip to the printed wiring; Fig. 7 is an edge view of a finished network assembly partly broken away; and Fig. 8 is a plan view of the network assembly.

The circuit assembly uses pin-like components having cylindrical bodies 1 with metallic end surfaces 2 and 3. If the component is a resistor, the body may be of molded resistance material and the terminal surfaces 2 and 3 may be sprayed on metal. If the component is a capacitor, the body 1 may be of tubular ceramic and the terminal portions 2 and 3 can be extensions of the electrode coatings on the inner and outer surfaces of the ceramic tube. These are examples of typical pin-like components. It will be noted that no leads are attached to the terminal surfaces 2 and 3 so that these are not the conventional components used in the electronic industry where there always is some form of lead attached to the terminal surfaces.

The components are mounted in aligned pairs of clips 4 and 5 respectively adjacent opposite edges of a strip 6 of insulating material. Certain of the clips 4 are provided with integral prongs 7 projecting beyond the strip 6 and useful for plugging into contacts to make connections to other parts of an electronic circuit. The clips 4 and 5 are accurately spaced from each other and along the edges of the strip so that the prongs 7 will always be accurately spaced. The accurate spacing between the clips 4 and 5 facilitates automatic assembly of the components into the clip. Because of the uniformity of spacing of the clips, it is possible to use long strips containing from 50 to 100 pairs of clips, which after assembly of the components can be cut into smaller pieces containing, for example, from 4 to 8 components.

The two styles of clips are shown in Figs. 4 and 5. Each of the clips has a base 8 or 8*a* with upstanding arms 9 forming a clip. Between the arms is an upstanding projection 10 in the form of an indentation in the underside of the base which cooperates with the terminal portion of the component to keep the body of the component elevated above the base of the clip. This is important because the body of the component extends from the clip 9 over the forward portion 11 of the base and the spacing is needed for insulation. Additional insulation between the base and component may be provided.

In both styles of clips, there are downwardly extending arms 12 which in the assembly to the panel 6 extend through and straddle the space between adjacent openings 13 and are clinched around the intervening section 14 as shown more clearly in Fig. 6. This provides a convenient method assembly of the clips to the panel strip 6. The openings 13 are relatively large compared to the thickness of the arms 12 which must pass through the openings. It will be noted that there is only one opening for each clip. Instead of making a pair of narrow openings for each of the arms 12 on the clips, a single wide opening 13 is made having opposite sides 15 spaced apart at the required spacing for the clips.

In the clip shown in Fig. 5, the prong 7 is integral with the base 11 of the clip. Both of the clips shown in Fig. 5 are adapted to be formed from sheet metal by relatively simple dies. It should be obvious that the clip forming arms 9 and the fastening arms 12 can be interchanged. When the clip forming arms 9 are at the end of the base now occupied by the fastening arms 12, the projection 10 will be unnecessary.

In addition to fastening the clips to the panel 6, the fastening arms 12 also make electrical connections to printed wiring on the underside of the panel strip. As shown in Fig. 3, this printed wiring may comprise sections 16 associated with a single clip, sections 17 associated with two adjacent clips, sections 18 associated with alternate clips, and a section 19 extending diagonally across to interconnect two clips at opposite edges of the strip. These are illustrative of the types of printed wiring which may be used. Obviously, the particular arrangement shown is merely to illustrate the variety of printed wiring elements which may be used.

Having the clips arranged along opposite edges of the strip 6 is convenient for dip soldering in case it is desired to make soldered connections between the clips 4 and 5 and the terminals 2 and 3 of the circuit components. This arrangement is also convenient in case it is desired to make soldered connections between the fastening arms 12 and the underlying printed circuit wiring 16—18 as the case may be. It is convenient to have the printed wiring on one face of the strip 6 and the components and clips on the opposite face of the strip but this is not essential. The separation produced by this arrangement is convenient in carrying out soldering operations when desired.

When the assembly has been completed and the strip 6 severed into assemblies of the desired number of components, the assemblies are then placed in a mold and a plastic case 20 is molded around the entire assembly except for the projecting prongs 7. The plastic case has the function of introducing a pressure contact between the clips 4 and 5 and the terminals of the components which in itself is sufficient to maintain the electrical connection to the clips. If this connection is supplemented by soldered connections, then the plastic molding will be sufficient to maintain the electrical connection in case any one of the soldered connections is defective. The molded plastic case 20 being of uniform size adapts the sub-assembly to automatic feeding machines used in the assembly of electronic circuits. The plastic flows through the openings 13 and also helps to hold the arms 12 clinched to the strip.

What is claimed as new is:

1. An electric circuit sub-assembly comprising a plurality of leadless circuit impedance components to be interconnected to form a network, said components having pin-like bodies arranged side by side in spaced relation with terminal surfaces at opposite ends of the bodies, a strip of insulating material, two rows of metal clips on one surface of the strip with the clips in each row spaced from each other and with the clips in one row spaced from and opposite the clips in the other to provide aligned pairs of clips so each pair receives the terminal surfaces of one of the components, two rows of spaced openings in the strip with each opening between adjacent clips in a row and of width determining the spacing between the clips, a pair of fastening prongs extending from each of the clips straddling and projecting through two adjacent openings to the opposite surface of the strip and clinched to the strip to clamp the clip to the strip, adjacent clips having prongs extending through the same opening, and conductors printed on the strip for making circuit interconnections between circuit components and electrically connected to the clips by being clamped between the strip and the clips.

2. An electric circuit sub-assembly comprising a plurality of leadless circuit impedance components to be interconnected to form a network, said components having pin-like bodies arranged side by side in spaced relation with terminal surfaces at opposite ends of the bodies, a strip of insulating material, two rows of metal clips on one surface of the strip, each having a base on said one surface of the strip and opposed wings integral with the base for receiving one of the terminal surfaces therebetween, and with the clips in each row spaced from each other and with the clips in one row spaced from and opposite the clips in the other row to provide aligned pairs of clips so each pair receives the terminal surfaces of one of the components, two rows of openings in the strip having a width corresponding to the spacing between adjacent clips, fastening devices integral with the bases of the clips each extending through the two adjacent openings to the opposite surface of the strip and clinched to the strip to clamp the bases of the clips to the strip, adjacent clips having fastening devices extending through the same opening, conductors printed on the strip for making circuit interconnections between circuit components and electrically connected to the clips by being clamped between the strip and the clips, and a plastic case molded around and embedding the strip and components, the plastic flowing through the openings and helping to hold the fastening devices clinched to the strip.

3. An electric circuit sub-assembly comprising a plurality of leadless circuit impedance components to be interconnected to form a network, said components having pin-like bodies arranged side by side in regular spacing with terminal surfaces disposed on opposite ends of the bodies, a strip of insulating material, two rows of metal clips on one surface of the strip with the clips in each row spaced from each other and along the strip on the same regular spacing as the components and with the clips in one row spaced from and opposite the clips in the other row to provide aligned pairs of clips so each pair of clips receives the terminal surfaces of one of the components, two rows of openings spaced along the strip, a pair of fastening prongs extending from each of the clips through two adjacent openings to the opposite surface of the strip and clinched to the strip to clamp the clip to the strip, and a wiring pattern of conductors for making circuit interconnections between circuit components printed on the strip with portions of the pattern to be connected to the clips disposed between adjacent holes in position to be clamped between the strip and the clips and electrically connected to the clips by the clinching of the fastening prongs to the strip.

References Cited in the file of this patent

UNITED STATES PATENTS

| | | |
|---|---|---|
| 1,527,458 | Yaxley | Feb. 24, 1925 |
| 1,791,123 | Costa | Feb. 3, 1931 |
| 2,229,989 | Roby | Jan. 28, 1941 |
| 2,586,854 | Myers | Feb. 26, 1952 |
| 2,607,821 | Arsdell | Aug. 19, 1952 |
| 2,613,252 | Heibel | Oct. 7, 1952 |
| 2,694,249 | Kapp | Nov. 16, 1954 |
| 2,707,274 | Kough | Apr. 26, 1955 |

FOREIGN PATENTS

| | | |
|---|---|---|
| 592,686 | Great Britain | Sept. 25, 1947 |